United States Patent Office 3,375,280
Patented Mar. 26, 1968

3,375,280
17-SUBSTITUTED STEROID DERIVATIVES
Kenneth G. Holden, Stratford, N.J., assignor to Smith Kline & French Laboratories, Philadelphia, Pa., a corporation of Pennsylvania
No Drawing. Filed Aug. 13, 1964, Ser. No. 389,470
5 Claims. (Cl. 260—586)

ABSTRACT OF THE DISCLOSURE

Compounds of the generic class of 17-loweralkoxymethyl-B-nortestosterone and intermediates for preparing these compounds having antiandrogenic activity. The compounds are prepared by reacting 17,20-epoxy steroids with an alkali metal lower alkoxide.

---

This invention relates to new 17α-alkoxy and aminomethyltestosterone derivatives. These derivatives have various pharmacodynamic activities such as antiandrogenic, hypocholesterolemic and central nervous system depressant activity. These compounds also have utility as chemical intermediates.

The compounds of this invention are illustrated by the following formula:

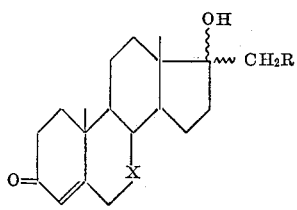

in which X represents methylene or preferably a single C—C bond; and R represents lower alkoxy or an N-tertiary-amino group having a maximum of 10 carbon atoms such as dialkylamino, piperidino, N-loweralkylpiperazino, morpholino, thiomorpholino or pyrrolidino. One skilled in the art will recognize the particular importance of the 17β-hydroxy-17α-substituted alkyl isomers. The compounds in the B-nor series are preferred because of their pronounced depressant (R is amino) and antiandrogenic (R is alkoxy) activity. The compounds in which X is methylene and R is amino also have pronounced cholesterol lowering activity.

These compounds are prepared by reacting either a specific isomer or mixture of isomers of 17,20-epoxy-3β-hydroxy-21-nor-B-norpregn-5-ene (Ser. No. 385,042, now Patent No. 3,300,489) with either an alkali metal lower alkoxide or an excess of a tertiary amine usually in an inert organic solvent in which the reactants are substantially soluble such as methanol, ethanol or isopropanol at elevated temperatures. The latter reactant is preferably used in large excess. The reaction is most often carried out at the reflux temperature of the reaction mixture for from about 1–12 hours.

The resulting 17-substituted 3β,17-dihydroxy-androst-5-ene is then oxidized at position 3 most conveniently under Oppenauer conditions, for example, using cyclohexanone and aluminum isopropoxide. The desired product of Formula I is isolated by standard procedures with purification by fractional crystallization or preferably chromatography over alumina.

In the normal testosterone series (X is methylene) certain members of the dihydroxyandrostene intermediate genus are known namely 3β-acetoxy-17β-hydroxy-17α-methoxymethyl-androst-5-ene (U.S. Patent No. 3,022,-324) and 3β-acetoxy-17β-hydroxy-17-ethylisopropylamino-androst-5-ene (Heusser et al. Helv. Chim. Acta. 33, 1093 (1950)). The B-nordihydroxyandrostene intermediates are novel and are an important part of this invention. Surprisingly these compounds in which R is alkoxy have antiandrogenic activity but no depressant activity. The compounds in which R is amino are potent central nervous system depressants.

The compounds of Formula I in the testosterone series in which R is amino, i.e., the primary amines, are known (U.S. Patent No. 3,102,126) but are prepared by means of the 17-cyano intermediate. Such methods do not lend themselves to tertiary amines. No pertinent art in the preferred B-nor series is known.

The terms "lower alkoxide," "lower alkyl" or "lower acyl" are considered as a practical matter to be limited to a maximum of 6 carbon atoms for the purpose of illustrating this invention. The symbol "⁀" represents either β or α configuration. At the 17-position when one substituent is β, the other must necessarily be α. Also the lower acyl derivatives of certain of the compounds of this invention may be prepared. Such are made by forcing acylation of the 17β-hydroxy groups such as by heating at reflux in acetic anhydride overnight. Also the 17β-tertiary aminomethyl compounds of this invention may optionally be converted into an equivalent nontoxic acid addition salt with a pharmaceutically acceptable organic or inorganic acid such as hydrochloric, sulfuric, phosphoric, sulfamic, ethanedisulfonic, maleic, succinic, etc. acids. Also the tertiary bases of this invention can be converted to nontoxic quaternary ammonium salts with pharmaceutically acceptable quaternizing agents such as lower alkyl halides, i.e., chlorides, bromides or iodides, lower alkyl sulfates, phenyl lower alkyl halides or sulfates, hydroxy or lower alkoxy substituted lower alkyl halides, etc. Also other standard variations in the nucleus will be obvious to those skilled in the art such as 19-nor, 4-halo or hydroxy, $\Delta^{1,2}$ or other modifications. These are included in this invention.

The following examples are designed to illustrate this invention but not to be construed as limiting its scope.

Example 1

A solution of 8 g. of 17β,20-epoxy-3β-hydroxy-21-nor-17-iso-B-norpregn-5-ene (Ser. No. 385,042, now Patent No. 3,300,489) in 200 ml. of methanol containing 8 g. of sodium methoxide is refluxed under nitrogen for 8 hours and is then maintained at room temperature for 16 hours. The reaction mixture is concentrated to 75 ml., diluted with 750 ml. of cold water, and filtered to give 17α-methoxymethyl-3β,17β-dihydroxy-B-norandrost-5-ene which melts at 118–120° C. after recrystallization from acetone.

A solution of 3 g. of 17α-methoxymethyl-3β,17β-dihydroxy-B-norandrost-5-ene in 350 ml. of toluene containing 50 ml. of distilled cyclohexanone and 4 g. of aluminum isopropoxide is slowly distilled during 3 hours so that the reaction mixture is reduced to about half its original volume. The cooled reaction mixture is poured into 500 ml. of cold 5% aqueous hydrochloric acid; the organic layer is separated and the aqueous layer is extracted with benzene. The combined organic fractions are steam distilled until the distillate is clear and the cooled nonvolatile aqueous mixture is extracted with benzene-ether. Evaporation of the organic extracts gives the crude product which is purified by chromatography on activity III Woelm alumina. Elution with benzene yields 17α-methoxymethyl-B-nortestosterone which melts at 107° C. after recrystallization from acetone-hexane.

Similarly the mixture of the two 17,20-epoxy isomers is treated as above to give additional amounts of the compounds described as well as 17β-methoxymethyl-3β,17α-dihydroxy-B-norandrost-5-ene and 17β-methoxymethyl-17α-hydroxy-B-norandrost-4-en-3- one, M.P. 131–133° C., after recrystallization from acetone-hexane, the isomeric pairs being separated by chromatography on activity III Woelm alumina.

*Example 2*

A solution of 8 g. of 17β,20-epoxy-3β-hydroxy-21-nor-17-iso-B-norpregn-5-ene in 200 ml. of methanol containing 80 ml. of distilled piperidine is maintained at room temperature for 72 hours. The reaction mixture is evaporated to a residue at reduced pressure. The residue is dissolved in 800 ml. of ether and treated with dry hydrogen chloride. The precipitated hydrochloride salt is collected by filtration and stirred with a mixture of 750 ml. of methylene chloride and 200 ml. of 5% ammonium hydroxide. The methylene chloride phase is separated, dried and evaporated to give 17α-N-piperidinomethyl-3β,17β-dihydroxy-B-norandrost-5-ene which melts at 83–84° C.

A solution of 5 g. of 17α-N-piperidinomethyl-3β,17β-dihydroxy-B-norandrost-5-ene in 500 ml. of toluene containing 56 ml. of distilled cyclohexanone and 6 g. of aluminum isopropoxide is slowly distilled during 3 hours so that the final volume of the reaction mixture is about 100 ml. The cooled reaction mixture is treated with 25 ml. of water and filtered. The filtrate is steam distilled until the distillate is clear and the cooled nonvolatile aqueous mixture is extracted with methylene chloride. Evaporation of the dried methylene chloride extracts yields 17α-N-piperidinomethyl-B-nortestosterone, M.P. 156–157° C. after recrystallization from acetone. The amine (500 mg.) is dissolved in ether and reacted with dry hydrogen chloride gas to separate the hydrochloride salt. Another portion (500 mg.) is heated at reflux with an excess of ethyl bromide in ethyl acetate to give the ethobromide.

Similarly the mixture of the isomeric starting materials is treated as above to give aditional amounts of the isomers described as well as 17β-N-piperidinomethyl-3β,17α-dihydroxy - B - norandrost - 5 - ene and 17β - N - piperidinomethyl - 17α - hydroxy - B - norandrost - 4 - ene-3-one, M.P. 178–179° C. after recrystallization from acetone, the isomeric pairs being separated by chromatography over alumina.

*Example 3*

A solution of 8.0 g. of 17β,20-epoxy-3β-hydroxy-21-nor-17-isopregn-5-ene (Ser. No. 385,042) in 200 ml. of methanol containing 8.0 g. of sodium methoxide is refluxed for 6 hours under a nitrogen atmosphere. The cooled solution is allowed to stand at room temperature for 16 hours and is then poured into water and extracted with methylene chloride. Evaporation of the dried methylene chloride extracts gives a residue of crude 17α-methoxymethyl-3β,17β-dihydroxyandrost-5-ene which melts at 158–160° C. after recrystallization from acetone.

The oxidation of 17α-methoxymethyl-3β,17β-dihydroxyandrost-5-ene is carried out as described in the B-nor series to give 17α-methoxymethyltestosterone, M.P. 102–104° C. after recrystallization from acetone-hexane.

*Example 4*

A solution of 10.0 g. of 17β,20-epoxy-3β-hydroxy-21-nor-17-isopregn-5-ene in 250 ml. of methanol is treated with 100 ml. of freshly distilled piperidine and allowed to stand at room temperature for 72 hours. The solution is concentrated to a residue at reduced pressure to give crude 17α - N-piperidinomethyl-3β,17β-dihydroxyandrost-5-ene which melts at 152–154° C. after recrystallization from acetone-hexane and then from methanol-water.

The oxidation of 17α - N - piperidinomethyl - 3β,17β-dihydroxyandrost-5-ene is carried out as described above to give 17α-N-piperidinomethyltestosterone which melts at 136–138° C. after recrystallization from acetonitrile.

A solution of 2.0 g. of 17α-N-piperidinomethyltestoterone in 50 ml. of acetonitrile and 15 ml. of methyl iodide is refluxed for 1.5 hours. The solution is concentrated and cooled and the crystals which separate are collected by filtration. After recrystallization from acetonitrile the purified 17α - N - piperidinomethyltestosterone methiodide melts at 233–235° C. Other tertiary amines are prepared similarly substituting molar equivalent quantities of the desired amine.

*Example 5*

A solution of 2 g. of 17β,20-epoxy-3β-hydroxy-21-nor-17-iso-B-norpregn-5-ene in 75 ml. of ethanol with 2 g. of potassium ethoxide is refluxed for 12 hours then worked up as described in Example 1 to give 17α-ethoxymethyl-3β,17β-dihydroxy-B-norandrost-5-ene.

This crude material is dissolved in 300 ml. of toluene containing 40 ml. of cyclohexanone and reacted with 3.5 g. of aluminum isopropoxide as described to give 17α-ethoxymethyl-B-nortestosterone.

*Example 6*

Aliquot portions of 2 g. of 17β,20-epoxy-3β-hydroxy-21-nor-17-iso-B-norpregn-5-ene in 50 ml. of methanol are reacted as described above in detail in turn with dimethylamine, diethylamine, pyrrolidine, morpholine and N-methylpiperazine respectively then oxidized under Oppenauer conditions with cyclohexanone and aluminum isopropoxide to give 17α-dimethylaminomethyl-B-nortestosterone, 17α - diethylaminomethyl-B-nortestosterone, 17α - N-pyrrolidinomethyl-B-nortestosterone, 17α-N-morpholinomethyl-B-nortestosterone and 17α-N-(N-methylpiperazino)methyl-B-nortestosterone.

Using 17β,20 - epoxy-3β-hydroxy-21-nor-17-isopregn-5-ene, or other 17-isomers, other members of the series are similarly prepared.

What is claimed is:
1. A compound of the formula:

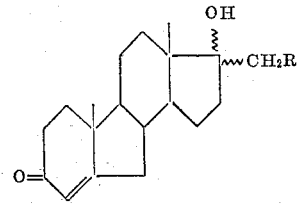

in which R is lower alkoxy.

2. A compound of the formula:

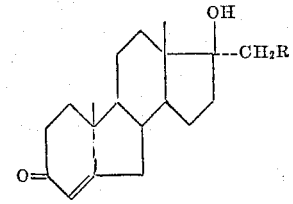

in which R is lower alkoxy.

3. 17α-methoxymethyl-B-nortestosterone.

4. A compound of the formula:

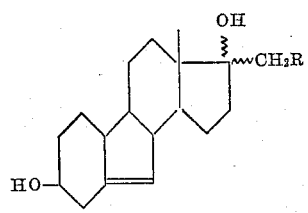

in which R is lower alkoxy.

5. 17α - methoxymethyl - 3β,17β - dihydroxy - B - norandrost-5-ene.

References Cited

Sondheimer et al., J. Am. Chem. Soc., vol. 77, pp. 4145 to 9 (1955).

LEON ZITVER, *Primary Examiner.*

M. JACOB, *Assistant Examiner.*